Dec. 25, 1962  F. G. REUTER  3,070,408
TORSION BAR SUPPORT
Filed May 27, 1959

INVENTOR.
FRANZ GOTTFRIED REUTER
BY
ATTORNEY

United States Patent Office 3,070,408
Patented Dec. 25, 1962

3,070,408
TORSION BAR SUPPORT
Franz Gottfried Reuter, Lemforde, Hannover, Germany, assignor, by mesne assignments, to Mobay Chemical Company, Pittsburgh, Pa., a corporation of Delaware
Filed May 27, 1959, Ser. No. 816,267
Claims priority, application Germany May 31, 1958
3 Claims. (Cl. 308—78)

This invention relates generally to the suspension system of a motor vehicle and, more particularly, to a novel support for a torsion bar used as a spring element in a motor vehicle suspension system.

It has been proposed before to support the end of a torsion bar against the frame of a motor vehicle by means of a fitting having a bushing adapted to receive the end of the torsion bar. The material from which the bushing is made must be wear-resistant and have low friction characteristics. Moreover, the support point should be substantially free from noise. An attempt has been made to provide a support having a metal bushing adapted to receive the end of the torsion bar surrounded by a rubber housing vulcanized to the bushing and adapted to be anchored to the frame of the vehicle. Such rubber-metal combinations have not been entirely satisfactory, however, because the forces required to distort the rubber disc are very great and consequently, the load imposed upon the housing for the rubber and the parts connected to it is excessive. Moreover, the rubber bushing deteriorates when subjected to oil or gasoline and soon reaches the point where it can no longer withstand the load applied thereto as the torsion bar moves in the suspension system.

It is, therefore, an object of this invention to provide an improved suspension system for a motor vehicle having a torsion bar as a spring element. Another object of the invention is to provide an improved support for a torsion bar on the frame of a motor vehicle. A more specific object of the invention is to provide an improved support for the end of a torsion bar at the point where the torsion bar is attached to the frame of a motor vehicle.

Other objects will become apparent from the following description with reference to the accompanying drawing in which FIGURE 1 is a plan view, partially in section, of one embodiment of the invention;

Figure 1:
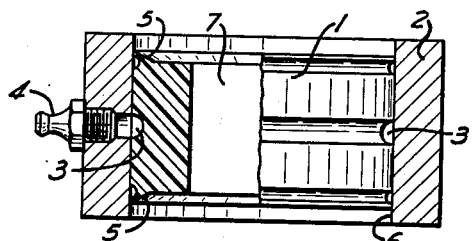

The foregoing objects and others are accomplished in accordance with this invention, generally speaking, by providing a support for a torsion bar having a cast polyurethane bushing adapted to receive the torsion bar and surrounded by a housing which supports the bushing, but permits the bushing to move with respect thereto. In other words, the invention contemplates a support for a torsion bar having a flexible rubber-like polyurethane plastic bushing adapted to fit snugly about the end of a torsion bar and further adapted to rotate within the supporting housing as the torsion bar rotates. The polyurethane bushing may be formed by a process disclosed in U.S. Patent 2,729,618 or by any other suitable process, and the formulations disclosed in this patent may be used in casting the polyurethane plastic. The polyurethane plastic forming the cast bushing must have a tensile strength of from about 6500 to about 8000 pounds per square inch, a torsional modulus of from about 25 to about 150 kg./cm.$^2$ and a Shore A hardness of from about 65° to about 95° in order to perform most satisfactorily in the suspension system of a motor vehicle. Inasmuch as the chemistry involved in preparing the polyurethane plastic does not form a part of the invention, reference is made to the above patent and other similar patents for a description of the process and formulations to be used.

It has been found that a support made in accordance with this invention is stronger than the heretofore available supports made from rubber and metal and is sufficiently flexible to perform satisfactorily as the torsion bar twists. Furthermore, the bushing is resistant to oil and gasoline, has a very high abrasion resistance and, therefore, can be expected to remain in operable condition in a motor vehicle for an extended period of time.

In one embodiment of the invention, which is of a substantially maintenance free construction, a support is provided with a ring insert between the cast polyurethane bushing and the supporting housing. The ring is preferably cast from a rubber-like polyurethane plastic and is attached to the housing, or frictionally engages the housing in such a manner that it does not move with respect thereto. The anti-friction characteristics of the interface between the ring insert and the flexible bushing may be improved by incorporating molybdenum disulfide and a silicone oil or hydrocarbon in the plastic used to cast the ring insert. From about 0.01 percent to about 5 percent by weight, and preferably from about 0.1 percent to about 1 percent by weight, based on the weight of the cured rubber-like, substantially non-porous polyurethane plastic, molybdenum disulfide is used in preparing the ring insert. Any suitable solid form of particulate molybdenum disulfide may be used but it is preferred to use a molybdenum disulfide powder having a particle size within the range of from about 0.002 to about 2 millimeters in cross-sectional dimension and preferably from about 0.002 to about 0.02 millimeter in order that the ring insert will have maximum abrasion resistance.

The molybdenum disulfide may be used in combination with any suitable dialkyl siloxane such as dimethyl siloxane, diethyl siloxane, and the like; or the molybdenum disulfide can be used in combination with a suitable hydrocarbon or graphite. Preferably, the liquid polysiloxane should have a viscosity of from about 50 to about 500 centistokes at 20° C.

The ring insert between the bushing and the housing may be provided at each end with a flange or collar which positions the bushing in the bore of the housing and also acts as a protective seal for the sliding surfaces of the assembly. The housing may be made from any suitable material such as, for example, steel or other suitable metal.

In another embodiment of the invention, a tetrafluorethylene sleeve is used between the bushing and the ring insert. This sleeve fits loosely between the bushing and insert and assures permanent lubrication of the sliding surface. Any suitable tetrafluorethylene plastic may be used in forming the bushing such as, for example, the one sold under the trade name, "Teflon."

In another embodiment of the invention, the flanged polyurethane bushing is provided with a grease lubricant between the sliding surface thereof and the surface of the housing. In this embodiment, the bushing is provided with a lubricating groove in the surface adjacent the housing and a suitable grease lubricant is supplied to the groove through a suitable fitting mounted on the housing. Sealing flanges may be provided at each end of the bushing to prevent dirt and other foreign material from entering the assembly between the moving surfaces. The sealing flanges may be cast from a more flexible polyurethane plastic than that used for casting the remainder of the bushing, if desired. Preferably, the polyurethane of these flanges will have an elongation of from about 550% to about 700%, while the elongation of the body portion of the bushing will be from about 300% to about 700%. The increased flexibility in the polyurethane plastic of the sealing flanges may be obtained by any suitable means such as by incorporating an activator in the composition. Alkali salts, such as, for example, sodium sulfate, organic fatty acids, such as maleic acid, aryl sulfonates or alkyl sulfonates may be used to increase the flexibility of the polyurethane. The polyester may be reacted with an excess of an isocyanate in forming the polyurethane plastic and then further reacted with a mixture of polyhydric alcohols. Some of the polyhydric alcohols should have two hydroxyl groups and others should have three or more in order to properly control the quality of the flexibility of the polyurethane.

Figure 2:
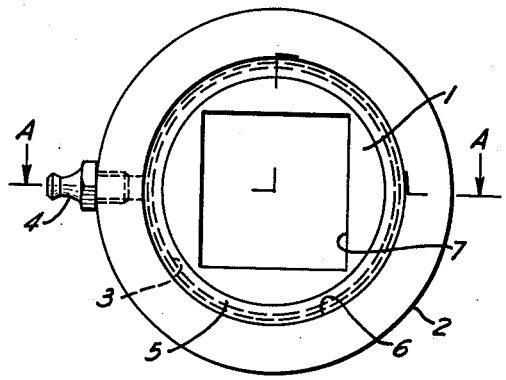
FIGURE 2 is an end view of the embodiment of FIGURE 1.

Referring now to the drawing for a more detailed description of the invention, one embodiment of the type using grease as a lubricant between the moving surfaces is illustrated in FIGURES 1 and 2. In this embodiment, a cast polyurethane bushing 1 having a torsional modulus of about 100 kg./cm.$^2$, a tensile strength of about 8000 and an elongation of about 700% forms a slidable fit in housing 2. Lubricating groove 3 in the surface of the bushing adjacent the inner surface of the housing communicates with grease fitting 4 which is threadably mounted on housing 2. Bushing 1 is provided with sealing flanges 5 at the outer edges of the bushing to seal the fitting against dust and dirt. Flanges 5 have a larger diameter than the outside diameter of the bushing in order that they will form a flexible seal by pressing against the wall of the bore in the housing. The sealing flanges 5 are cast from a more flexible polyurethane plastic than that used in forming the bushing body and have an elongation of about 700%. Rectangular opening 7 in the center of the bushing 1 is adapted to receive the end of a torsion bar. The support is mounted on the frame of a motor vehicle when used in the suspension system thereof. Preferably, opening 7 is smaller in cross-section than the cross-section of the torsion bar so that the bushing is stretched thereabout.

Figure 3:
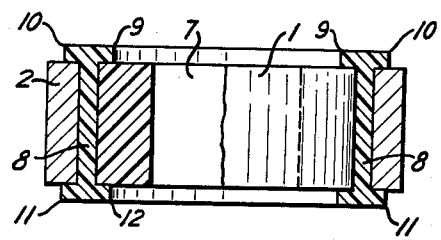
FIGURE 3 illustrates another embodiment of the invention, partially in section.
Figure 4:
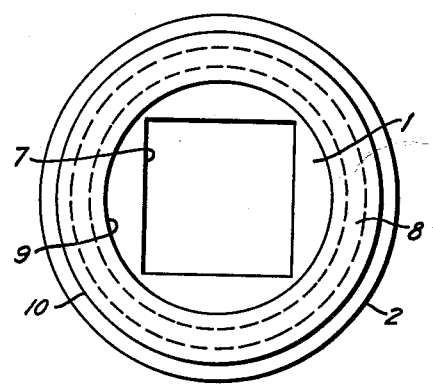
FIGURE 4 is an end view of the embodiment of FIGURE 3.

The embodiment illustrated in FIGURES 3 and 4 is substantially maintenance free. In this embodiment, bushing 1 having an opening 7 is surrounded by ring insert 8 lying between the outside wall of the bushing and the inside wall of the housing. Ring insert 8 is fixedly secured against the housing and is cast from a polyurethane plastic. Bushing 1 forms a slidable fitting with insert 8. Insert 8 contains about one percent molybdenum disulfide and about one percent by weight of dimethyl siloxane oil having a viscosity of about 50 centistokes. Insert 8 is provided with collars (9, 10, 11, and 12) which position the bushing 1 in housing 2 and seals the sliding surfaces against dust and dirt. As shown in the drawing, these collars extend over the edges of the bushing and the housing giving the insert an "I" shape in cross-section.

Figure 5:
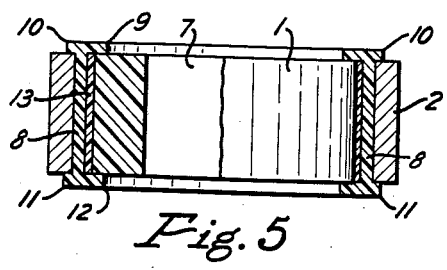
FIGURE 5 is a plan view, partially in section, of still another embodiment of the invention.

The embodiment shown in FIGURE 5 is provided with a tetrafluoroethylene sleeve 13 fitting loosely between ring insert 8 and bushing 1. In this embodiment, ring insert 8 is also provided with collars (9, 10, 11, 12) fitting over the edges of housing 2 and extending across insert 8 and over the edge of bushing 1 to insure that dirt does not enter between the sliding surfaces.

Although the invention has been described in considerable detail in the foregoing, it is to be understood that such detail is solely for the purpose of illustration and that variations can be made by those skilled in the art without departing from the spirit and scope of the invention except as set forth in the claims.

What is claimed is:

1. A support having a torsion bar comprising a rubber-like, substantially non-porous polyurethane plastic bushing having an opening therein adapted to receive the end of a torsion bar in a vehicle suspension system, said bushing being adapted to fit snugly about said torsion bar and to rotate as the torsion bar rotates, a housing about and separated from said bushing, a cast rubber-like polurethane plastic insert lying adjacent the inner wall of the housing, and a tetrafluorethylene sleeve lying between said insert and said bushing, said insert having an I-shaped cross-section to provide collars at each end thereof which extend over the edges of the housing and the bushing thereby sealing the assembly against the entrance of foreign material.

2. A support for a torsion bar comprising a rubber-like substantially non-porous polyurethane plastic bushing having an opening therein adapted to receive the end of a torsion bar in a vehicle suspension system, said torsion bar fitting closely within said opening in said bushing to thereby cause said bushing to rotate as said torsion bar rotates, a housing about and separate from said bushing, a cast rubber-like polyurethane plastic insert lying adjacent the inner wall of said housing, said insert having an I-shaped cross-section to thereby provide collars at each end thereof which extend over the edges of the housing and the bushing thereby sealing the assembly against the entrance of foreign material and a means for lubricating the surface between the said insert and said bushing.

3. A support for a torsion bar in the suspension system of a vehicle comprising a cast rubber-like polyurethane plastic bushing, a housing about the bushing and a cast polyurethane insert fitting between the housing and the bushing, said insert being fixed to said housing, said insert containing molybdenum disulfide particles thereby providing a lubricated surface against the adjacent surface of the bushing, said insert having collars on each end thereof which extend over the edges of said bushing and said housing thereby sealing the assembly against the entry of foreign material.

References Cited in the file of this patent

UNITED STATES PATENTS

| Re. 8,135 | Saladee | Mar. 26, 1878 |
| 2,431,921 | Cook | Dec. 2, 1947 |
| 2,702,730 | Ivanoff et al. | Feb. 22, 1955 |
| 2,729,618 | Muller | Jan. 3, 1956 |
| 2,935,757 | Phillips | May 10, 1960 |

FOREIGN PATENTS

| 695,195 | Great Britain | Aug. 5, 1953 |
| 757,582 | Great Britain | Sept. 19, 1956 |

OTHER REFERENCES

Frictional Behaviour . . . Molybdenum Disulphide by Bowden and Shooter on page 50 in Molybdenum Disulfide as a Lubricant, publication by Climax Molybdenum Co.